US007896103B2

(12) United States Patent
Johnson et al.

(10) Patent No.: US 7,896,103 B2
(45) Date of Patent: Mar. 1, 2011

(54) POWER TOOL HOUSING SUPPORT STRUCTURES

(75) Inventors: Joshua Odell Johnson, Hellertown, PA (US); Ryan Scott Amend, Easton, PA (US); Joseph Constantine Bouboulis, Asbury, NJ (US); Patrick Sean Livingston, Easton, PA (US); Douglas Edward Souls, Andover, NJ (US)

(73) Assignee: Ingersoll Rand Company, Montvale, NJ (US)

( * ) Notice: Subject to any disclaimer, the term of this patent is extended or adjusted under 35 U.S.C. 154(b) by 163 days.

(21) Appl. No.: 12/025,187

(22) Filed: Feb. 4, 2008

(65) Prior Publication Data

US 2009/0194306 A1 Aug. 6, 2009

(51) Int. Cl.
*H02K 9/00* (2006.01)

(52) U.S. Cl. .................... 173/211; 173/162.1; 173/216; 173/217; 310/50

(58) Field of Classification Search ................. 173/210, 173/211, 162.1, 162.2, 217, 216, 170; 310/47, 310/50
See application file for complete search history.

(56) References Cited

U.S. PATENT DOCUMENTS

| | | | | |
|---|---|---|---|---|
| 3,652,879 | A * | 3/1972 | Plunkett et al. | 310/50 |
| 4,081,704 | A * | 3/1978 | Vassos et al. | 310/50 |
| 4,133,971 | A | 1/1979 | Boyd et al. | |
| 4,905,772 | A * | 3/1990 | Honsa et al. | 173/162.1 |
| 5,269,733 | A * | 12/1993 | Anthony, III | 475/331 |
| 5,624,000 | A * | 4/1997 | Miller | 173/216 |
| 6,286,611 | B1 * | 9/2001 | Bone | 173/216 |
| 6,672,402 | B2 * | 1/2004 | Ortt et al. | 173/1 |
| 6,729,414 | B2 * | 5/2004 | Cooper et al. | 173/217 |
| 7,021,399 | B2 * | 4/2006 | Driessen | 173/29 |
| 7,090,032 | B2 * | 8/2006 | Wada et al. | 173/217 |
| 7,152,695 | B2 * | 12/2006 | Happ et al. | 173/217 |
| 2007/0256914 | A1 | 11/2007 | Lohr et al. | |
| 2008/0000665 | A1 | 1/2008 | Kokinelis et al. | |

FOREIGN PATENT DOCUMENTS

| | | |
|---|---|---|
| DE | 10 2004 051913 | 2/2006 |
| EP | 1 862 268 | 12/2007 |

OTHER PUBLICATIONS

PCT Partial international search dated Apr. 17, 2009 (6 pages).

* cited by examiner

*Primary Examiner*—Scott A. Smith
(74) *Attorney, Agent, or Firm*—RatnerPrestia

(57) ABSTRACT

A tool housing which in one aspect includes a body defining a head portion with a handle portion depending therefrom to define a forward and/or a rear junction. A metal reinforcing member is configured to span along an inside surface of the body from the head portion to the handle portion such that the reinforcing member bridges either the forward or rear junction. In another aspect, the tool assembly comprises a tool housing body, a motor positioned within the tool body housing, a drive mechanism connected with the motor to define a unitary motor/drive mechanism assembly, and at least one elastic isolating member extending about a portion of the motor/drive mechanism assembly such that the motor/drive mechanism assembly is elastically isolated relative to the housing body.

9 Claims, 8 Drawing Sheets

POWER TOOL HOUSING SUPPORT STRUCTURES

BACKGROUND OF THE INVENTION

The present invention relates to power tools, and more particularly, to tool housings for power tools.

Various power tools, including corded electric, cordless electric and pneumatic tools, are well-known. Examples of such tools include, but are not limited to, drills, drill drivers, impact wrenches, grease guns and the like. Many of these tools have a pistol style housing generally including a tool body defining a head portion with a handle depending therefrom. A trigger or the like is typically provided at the forward junction of the head portion and the handle. In an effort to make such tools lighter, the tool body is typically manufactured from plastic or the like formed in a clam shell manner in which opposed halves of the body are formed separately and then joined together. Such tools have been known to experience cracking, particularly when dropped. It is also desirable to protect internal components, e.g. the motor or the like, if the tool is subject to a significant impact.

It is desired to provide an improved pistol style and/or clam shell style tool housing and support structure.

SUMMARY OF THE INVENTION

The present invention provides in at least one aspect a pistol style tool housing. The tool housing includes a body defining a head portion with a handle portion depending therefrom to define a forward and/or a rear junction. A metal reinforcing member is configured to span along an inside surface of the body from the head portion to the handle portion such that the reinforcing member bridges either the forward or rear junction. In at least one embodiment, body includes opposed body halves, each having at least rear engaging perimeters which are configured to engage one another when the body halves are secured together and wherein the reinforcing member extends along at least a portion of the rear engaging perimeters.

In another aspect, the invention provides a tool assembly comprising a tool housing body, a motor positioned within the tool body housing, and a drive mechanism connected with the motor to define a unitary motor/drive mechanism assembly. At least one elastic isolating member extends about a portion of the motor/drive mechanism assembly such that the motor/drive mechanism assembly is elastically isolated relative to the housing body. In yet another aspect, the tool assembly further comprises a motor/drive interface configured to connect the motor with the drive mechanism and an interface isolating assembly extends about a portion of the motor/drive interface such that the motor/drive interface is elastically isolated relative to the housing body.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Figure 1:
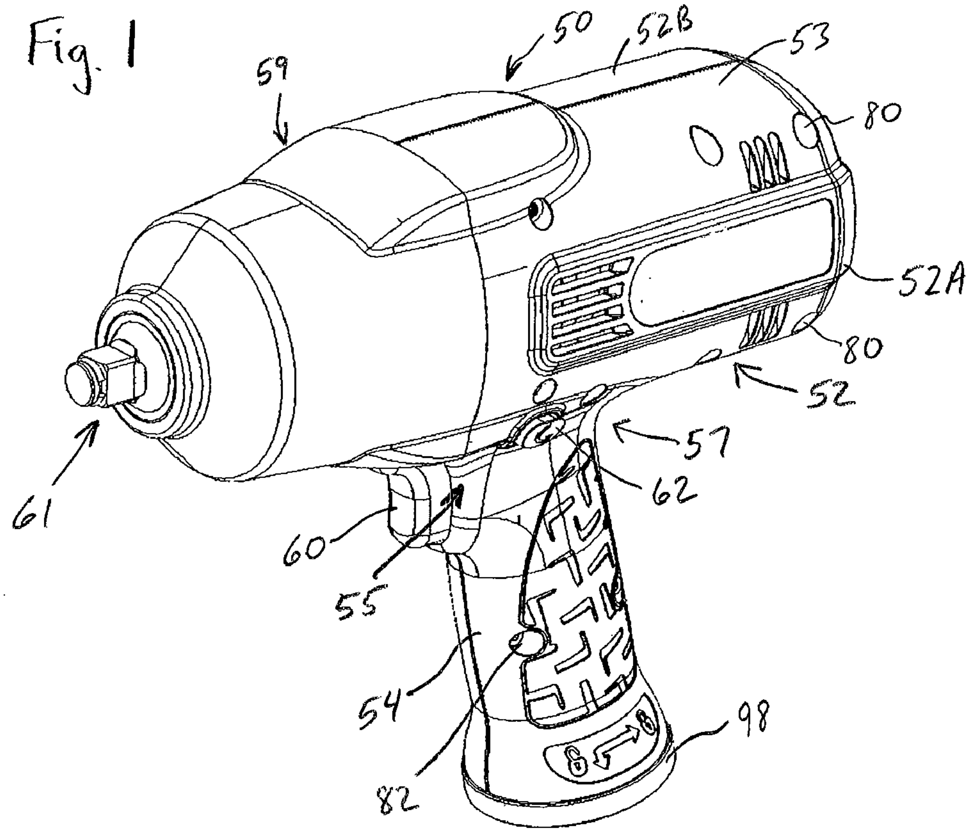
FIG. 1 is an isometric view of an illustrative impact wrench tool of the present invention.
Figure 2:
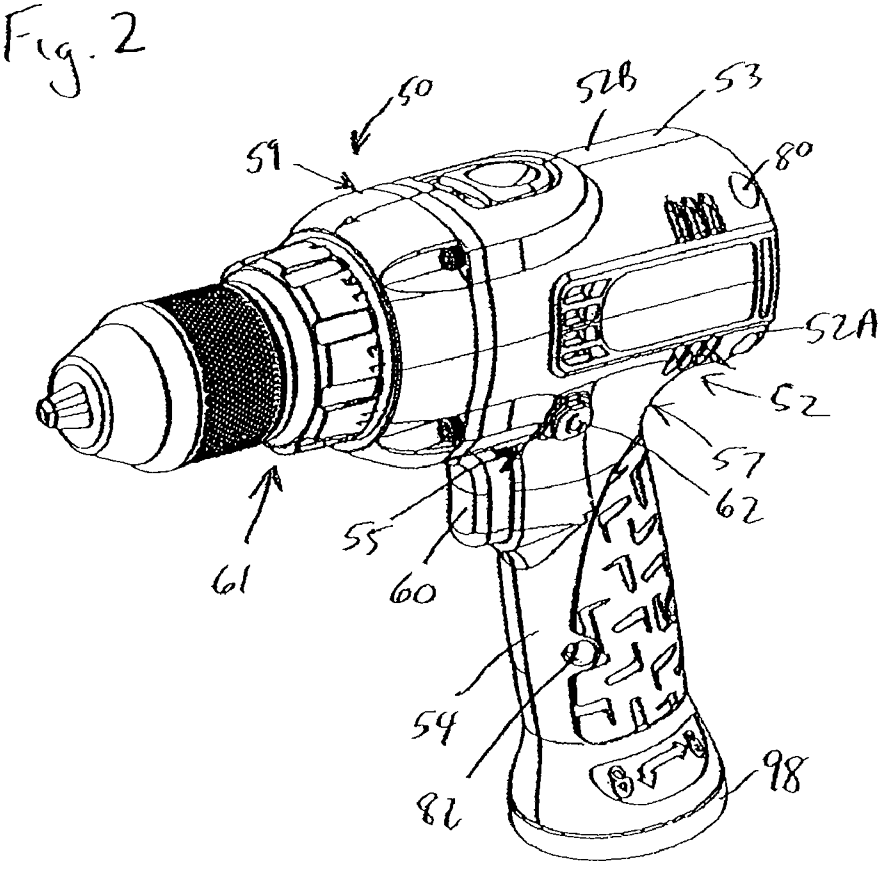
FIG. 2 is an isometric view of an illustrative drill tool of the present invention.
Figure 4:
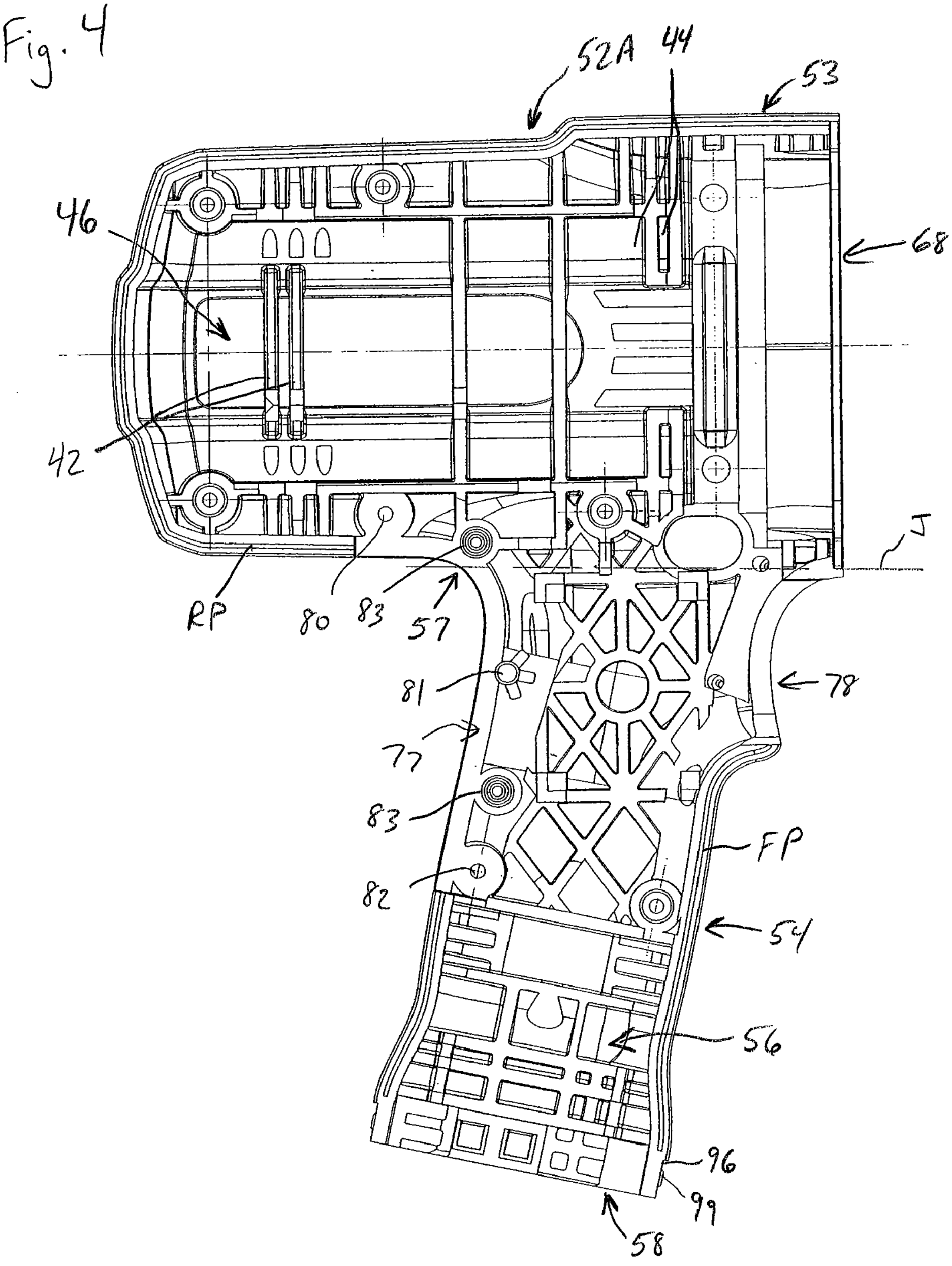
FIG. 4 is an elevation view illustrating the inside of one half of the clam shell housing.

Referring to FIGS. 1-2, various exemplary power tools 50 are illustrated. In FIG. 1, the illustrated tool 50 is a cordless impact wrench and in FIG. 2, the illustrated tool 50 is a cordless drill, however, the present invention is not limited to such tools. For example, but not limited to, the tool 50 may be cordless or corded, pneumatic, or otherwise powered. Furthermore, the invention is not limited to drills and impact wrenches, but includes other power tools. Each of these illustrated tools 50 includes a tool body 52 defining a head portion 53 and a handle 54 depending therefrom. In each of these illustrated tools 50, a forward junction 55 and a rearward junction 57 is defined at the junction between the head portion 53 and the handle 54. Referring to FIG. 4, an imaginary plane J extends along the junction between the head portion 53 and the handle 54. In each of these illustrated tools 50, a trigger 60 is provided at the forward junction 55, however, such is not required. In each of these illustrated tools 50, a forward/reverse slide switch 62 is also provided adjacent the forward junction 55. Again, such is not required. Forward of the head portion 53 is a head cap 59. As illustrated in FIGS. 1-2, the head cap 59 can have various configurations. Furthermore, as illustrated in FIGS. 1-2, the tool head 61 can also have various configurations forward the head cap 59.

Figure 3:
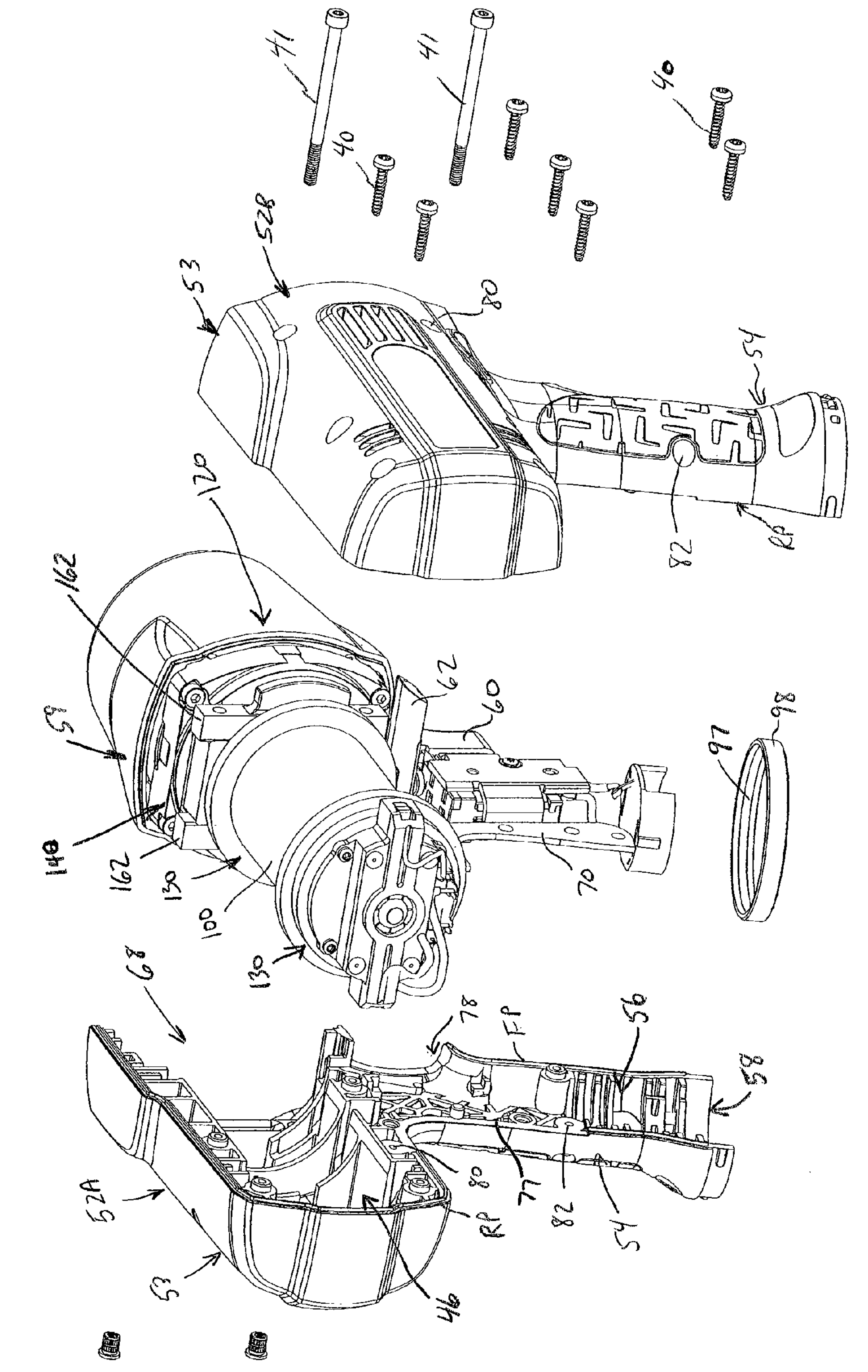
FIG. 3 is a exploded, rear isometric view of the impact wrench tool of FIG. 1.

Referring to FIGS. 3 and 4, the tool housing body 52 generally includes first and second tool body halves 52A and 52B. In these illustrated embodiments, the head portion 53 of the body halves 52A and 52B defines a hollow area 46 to house the motor 100 and a portion of the drive mechanism 120. Again, the drive mechanism 120 may have various configurations and configured for various functions. In the present embodiment, a drive opening 68 is defined at the forward end of the head portion 53.

In each of these illustrated embodiments, the handle 54 defines a generally hollow area 56 with an opening 58 into the hollow area 56. The opening 58 is configured to receive a battery pack (not shown). As set forth above, the present invention is not limited to cordless power tools. Furthermore, while the illustrated embodiments provide the hollow area 56 and the opening 58 within the handle 54 of the electric tool 50, the invention is not limited to such. If a hollow area 56 is provided, it may be provided at any desired location within the tool 50 with the opening 58 correspondingly positioned to open into the hollow area 56.

Upon assembly, the body halves 52A and 52B are joined together by screws 40, bolts 41 or the like extending through various screw holes 80, 82. Each body half 52A, 52B has a forward engaging perimeter FP and a rear engaging perimeter RP which engages the respective perimeter of the other body half 52A, 52B when they are joined. In the present embodiment, the forward engaging perimeter FP extends from the battery opening 58 to the trigger opening 78 while the rear engaging perimeter RP extends from the battery opening 58 to the drive opening 68.

Referring to FIGS. 3-7, in the present embodiment, a reinforcing member 70 extends between the head portion 53 and the handle 54, bridging the imaginary plane J at the junction between the head portion 53 and the handle 54. The reinforcing member 70 is illustrated along the rear perimeter RP bridging the imaginary plane adjacent to the rearward junction 57. The reinforcing member 70 may further configured to extend along all or a more substantial portion of the rear engaging perimeter RP. Furthermore, a reinforcing member may also be provided additionally, or alternatively, along the forward engaging perimeter FP. As illustrated in FIG. 4, a portion 77 of the perimeter RP may be recessed to accommodate the reinforcing member.

Figure 5:
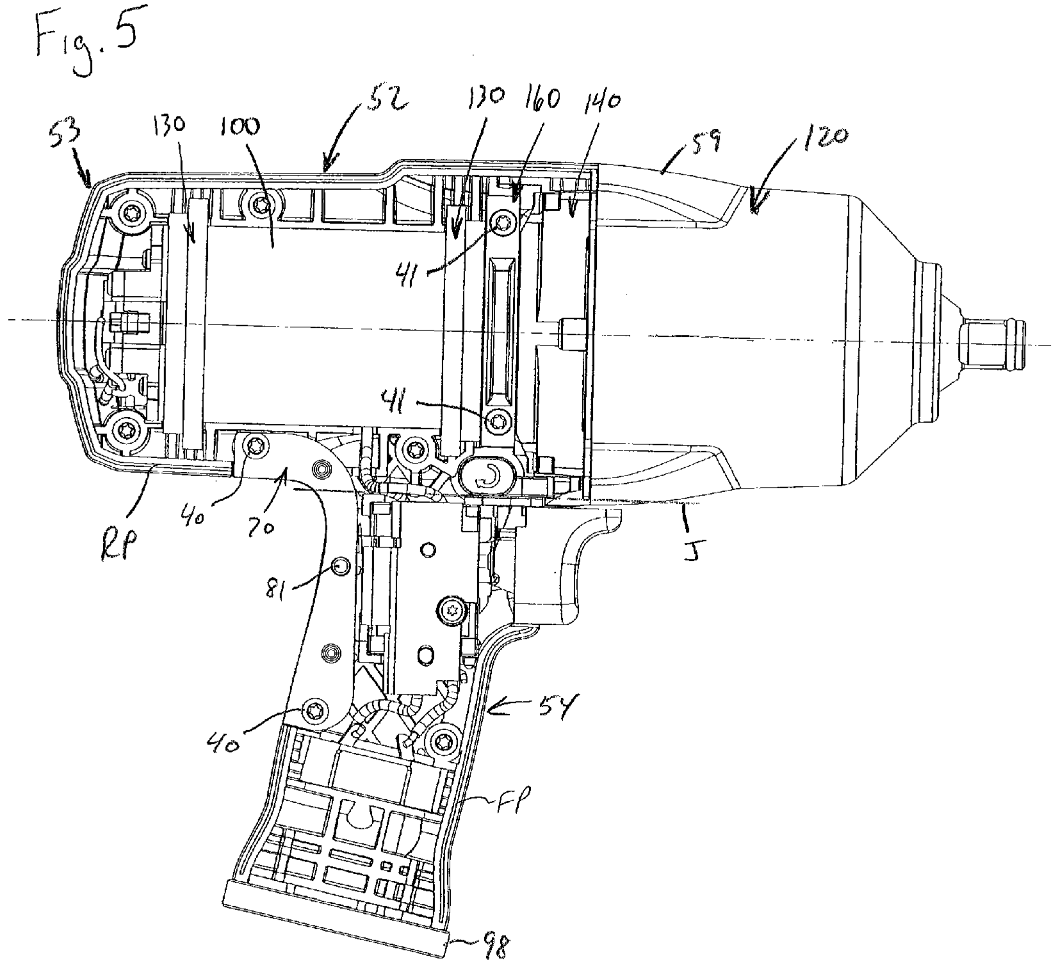
FIG. 5 is an elevation view of the impact wrench tool of FIG. 1 with one half of the clam shell housing removed.
Figure 6:
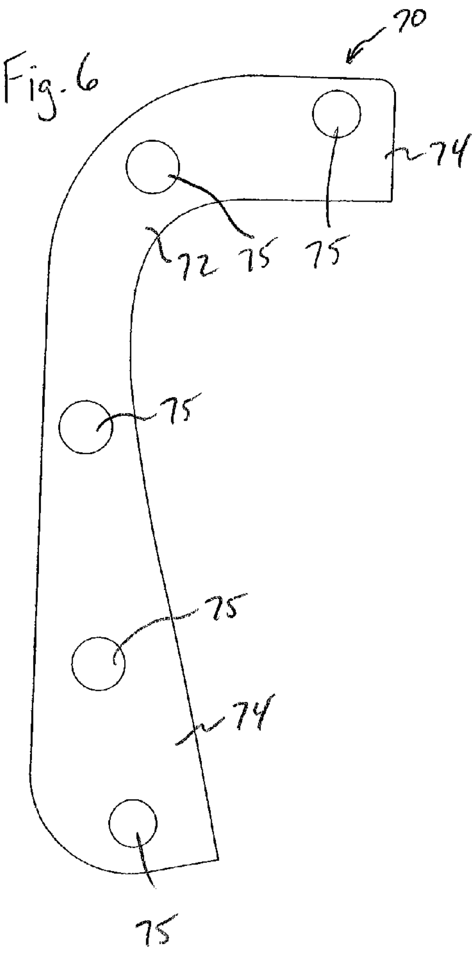
FIG. 6 is an elevation view illustrating an embodiment of the reinforcing member in accordance with at least one aspect of the invention.
Figure 7:
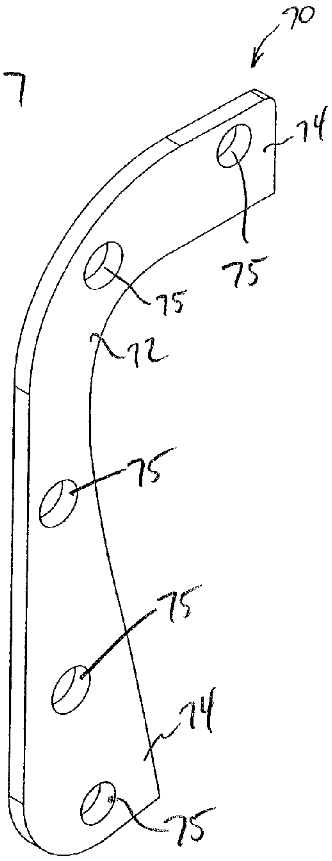
FIG. 7 is an isometric view of the reinforcing member of FIG. 6.

The reinforcing member 70 desirably has a configuration complementary to the configuration of the perimeter RP, FP over which extends. In the present embodiment, the reinforcing member 70 has an angled configuration complementing the configuration of the rear junction 57 between the head portion 53 and the handle 54. In the present embodiment, the reinforcing member 70 has a narrow middle portion 72 with wider end portions 74. The wider end portions 74 may provide a greater area for connection to the housing body. The reinforcing member 70 may have other configurations, for example, a consistent width along its length. As illustrated, the reinforcing member 70 has a plurality of holes 75. Referring to FIGS. 3-5, the holes 75 are configured to align with screw holes 80, 82 or posts 81 formed on one of the body halves 52A, 52B. The opposite half 52A, 52B has a receiving opening 83 configured to receive the posts 81 when the halves 52A, 52B are joined. The reinforcing member 70 may be supported on the posts 81 and thereafter secured in position by housing screws 40 as the housing body 52 is assembled. Alternatively, separate screws or the like may secure the reinforcing member 70 to one of the body halves 52A, 52B prior to assembly.

The reinforcing member 70 is preferably manufactured from a metal, for example, steel, but may be manufactured from other materials having a higher tensile strength than the material of which the housing body 52 is manufactured, for example, composite materials or reinforced plastics.

Figure 8:
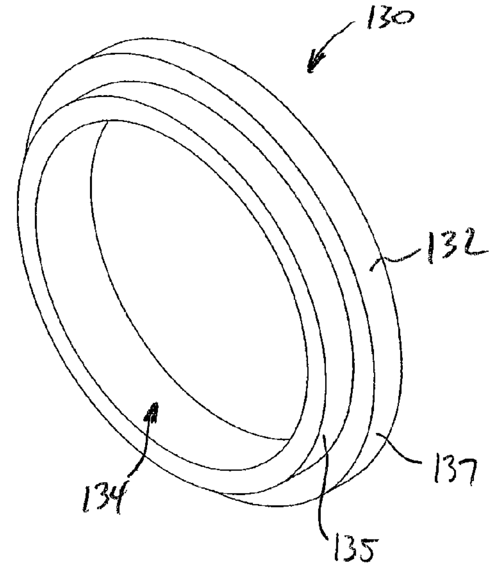
FIG. 8 is an isometric view illustrating an embodiment of a motor isolating member in accordance with at least one aspect of the invention.

Referring to FIGS. 1-5, a continuous reinforcing ring 98 is preferably provided about the tool housing 52 to maintain the halves 52A and 52B from splitting. Since the ring 98 is continuous, it is less susceptible to wear or loosening. In the illustrated embodiments, the ring 98 is provided adjacent to the opening 58. As illustrated in FIG. 4, the housing 52 may be provided with a circumferential channel 96 configured to receive the ring 98. As illustrated in FIG. 8, the ring 98 may include an internal channel 97 such that the ring 98 is snap fit over projections 99 extending from the housing 52 about the channel 96. While the reinforcing ring 98 is illustrated about the opening 58, it is not limited to such position. For example, the reinforcing ring may be positioned adjacent to the junction plane J, about the forward end of the head portion 53, the rearward end of the head portion 53 or any other location where radial forces may make such desirable. Additionally, while a pistol style housing is illustrated, the reinforcing ring 98 may be used with tools having other configurations, for example, a linear tool body.

The reinforcing ring 98 is preferably manufactured from metal, but may be manufactured from other substantially rigid materials. The reinforcing ring 98 is preferably formed as a continuous member and snap fit or otherwise positioned about the housing 52. Alternatively, the reinforcing ring 98 may be formed with open ends which are attached, for example, via welding, after the ring 98 is positioned about the housing 58.

Referring to FIGS. 3-5 and 8-16, another aspect of one or more embodiments of the present invention is illustrated. As explained above, in the present embodiment, the head portion 53 defines a hollow area 46 to house the motor 100 and a portion of the drive mechanism 120. With reference to FIGS. 3, 5 and 11-13, a motor/drive interface 140 is connected between the motor 100 and the drive mechanism 120. The interface 140 includes a mounting surface 142 for the motor and a mounting surface 144 for the drive mechanism 120 with a transverse surface 146 extending therebetween. As such, the motor 100 and the drive mechanism 120 are interconnected in a substantially rigid, unitary assembly. The interface 140 is not limited to the specific configuration illustrated and described and may have other configurations. The transverse surface 146 has a pair of through bores 143 configured for passage of the assembly bolts 41. Upon assembly, bolts 41 pass through the bores 143, thereby substantially axially fixing the interface 140 relative to the housing body 52.

To support these components relative to the housing and reduce the risk of impact damage, the motor 100 and drive mechanism interface 140 are supported by motor isolation members 130 and an isolation assembly 160, respectively. While the motor isolation members 130 and the isolation assembly 160 are described with respect to a piston style housing, they are not limited to such and may be used with tools of various constructions.

Figure 9:
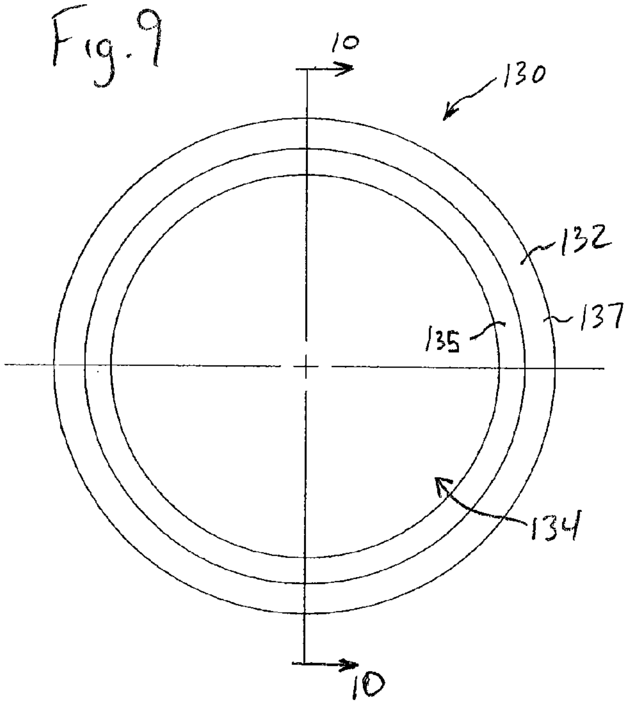
FIG. 9 is a front elevation view of the isolating member of FIG. 8.
Figure 10:
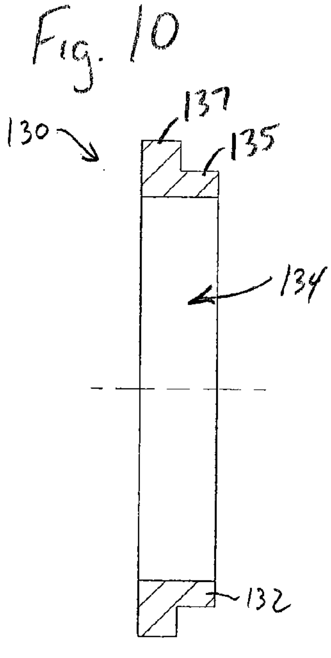
FIG. 10 is a cross-sectional view along the line 10-10 in FIG. 9.
Figure 11:
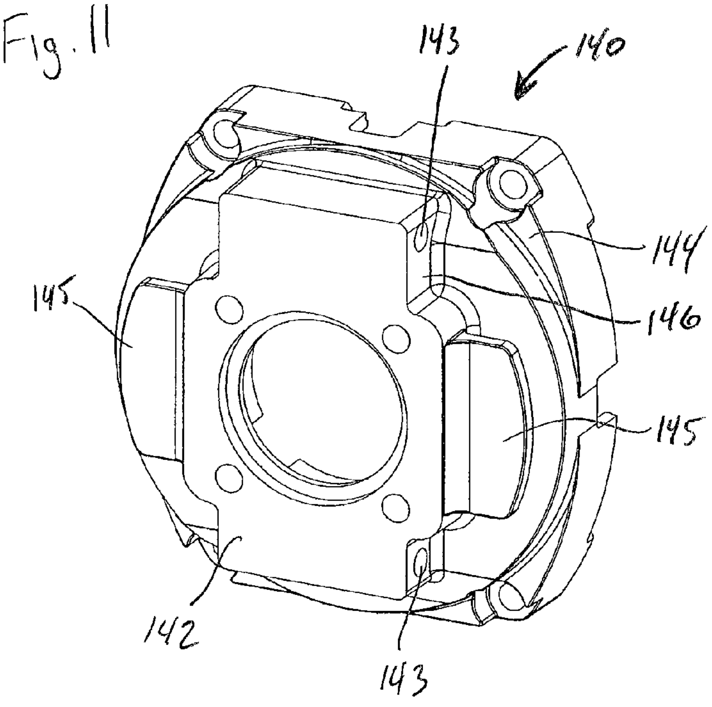
FIG. 11 is an isometric view illustrating the motor/drive interface of the impact wrench tool of FIG. 1.
Figure 12:
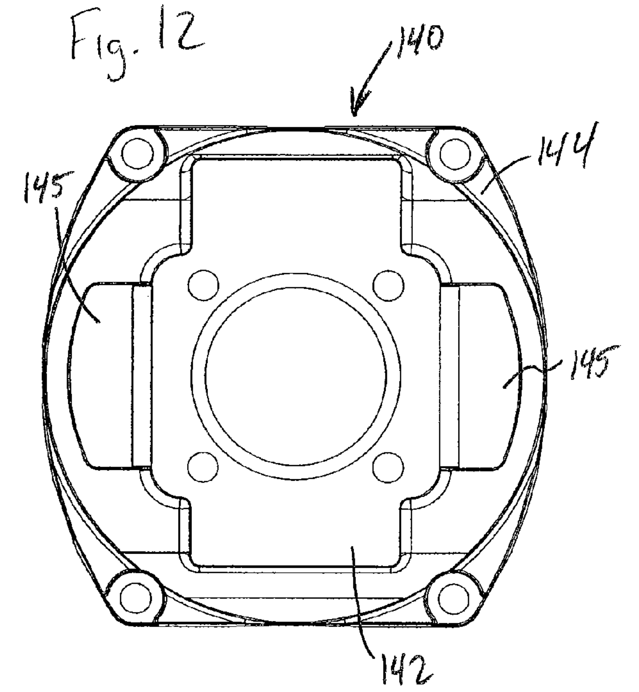
FIG. 12 is a front elevation view of the motor/drive interface of FIG. 11.
Figure 13:
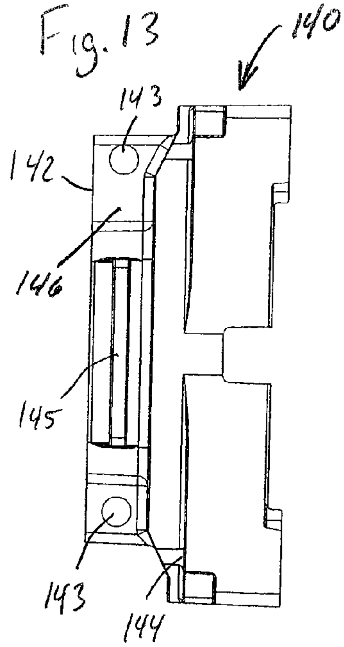
FIG. 13 is a side elevation view of the motor/drive interface of FIG. 11.

Referring to FIGS. 8-10, each motor isolation member 130 is defined by a ring member 132 manufactured from an elastomeric material. The elastomeric material may be any material, whether natural, synthetic or a combination thereof, having a desired elasticity. The ring member 132 defines an inner passage 134 configured to frictionally fit the motor 100 therein. The ring member 132 preferably has a stepped cross-section with an inner step portion 135 and an outer step portion 137 which has a larger diameter than the inner step portion 135. The stepped configuration provides multiple levels of elastic response.

Referring again to FIGS. 3-5, a motor isolation member 130 is positioned on each end of the motor 100. Rear and forward support surfaces 42 and 44, respectively, are defined within the housing body halves 52A, 52B and are configured to engage the inner and outer step portions 135, 137 of the ring member 132. As such, the motor 100 is supported elastically isolated from the housing body 52.

Figure 14:
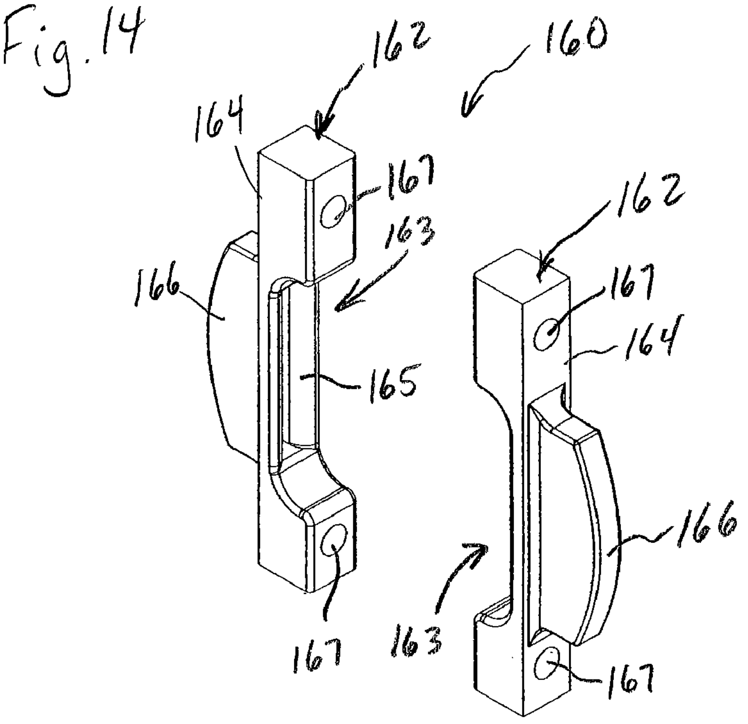
FIG. 14 is an isometric view illustrating an embodiment of a motor/drive isolating assembly in accordance with at least one aspect of the invention.
Figure 15:
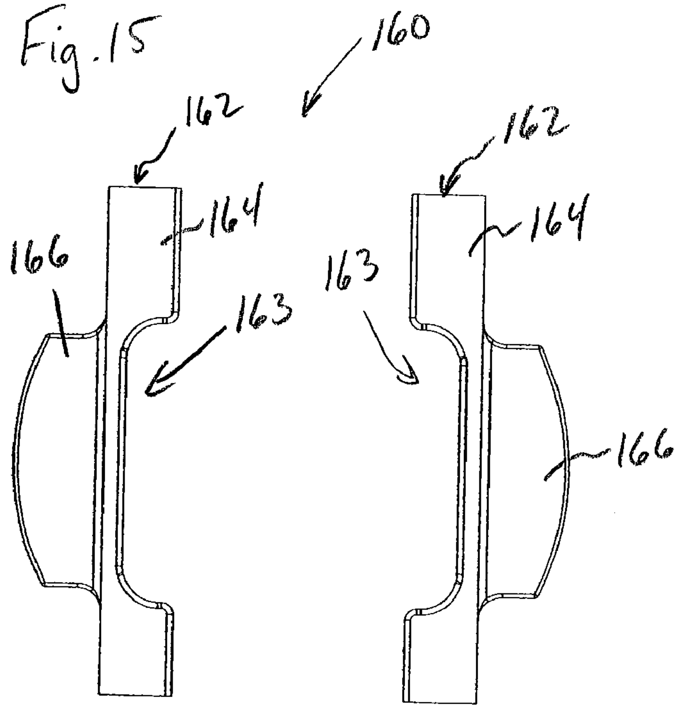
FIG. 15 is a front elevation view of the isolating assembly of FIG. 14.
Figure 16:
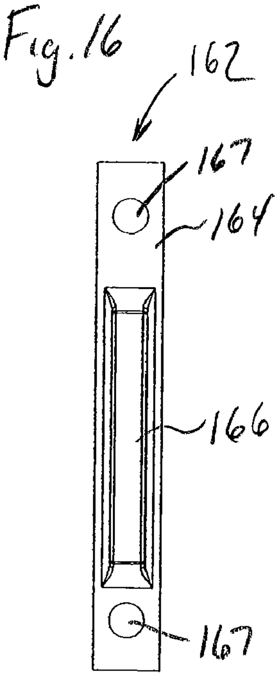
FIG. 16 is a side elevation view of one of the isolating members of the isolating assembly of FIG. 14.

To provide impact absorption, the interface 140 is supported relative to the housing body 52 by the isolation assembly 160. Referring to FIGS. 14-16, the isolation assembly 160 of the present embodiment includes a pair of interface isolation members 162. Each interface isolation member 162 includes a body 164 manufactured from an elastomeric material. The elastomeric material may be any material, whether natural, synthetic or a combination thereof, having a desired elasticity. The body 164 includes a recess 163 configured to complement and receive a portion of the transverse surface 146 of the interface 140. Each body 164 further includes an outward projection 166 with an internal slot 165. Each internal slot 165 is configured to receive and surround a respective wing member 145 extending from the respective received portion of the transverse surface 146. The received wing member 145 is preferably surrounded on its five extending surfaces such that it is elastically isolated in each direction. The interface isolation members 162 thereby support the interface 140 elastically isolated from the housing body 52. To further isolate the interface 140 from the bolts 41 extending therethrough, each interface isolation member 162 includes a pair of through passages 167 configured to align with the through bores 143. The through bores 143 are desirably sized to have a slight clearance with respect to the bolts 41 while the passages 167 have a tight fit about the bolts 41. The interface 140 is thereby elastically isolated from the bolts 41 through their contact with the interface isolators 162. With the motor 100 and the interface 140 both elastically isolated from the housing body 52, the unitary motor/drive mechanism assembly is complete elastically supported relative to the housing body 52.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A tool assembly comprising:

a tool housing body;

a motor positioned within the tool body housing;

a drive mechanism connected with a first mounting surface of a motor/drive interface member and the motor connected to a second mounting surface of the motor/drive interface member to define a unitary motor/drive mechanism assembly; and at least one elastic isolating member extending about a portion of the motor/drive mechanism assembly such that the motor/drive mechanism assembly is elastically isolated relative to the housing body and an interface isolating assembly axially aligned with and extending about a portion of the motor/drive interface member such that the motor/drive interface member is elastically isolated relative to the housing body.

2. The tool assembly of claim 1 further comprising a second elastic isolating member, the elastic isolating members positioned adjacent opposite ends of the motor.

3. The tool assembly of claim 1 wherein the elastic isolating member has a ring configuration with a through opening which receives the motor therethrough.

4. The tool assembly of claim 3 wherein the elastic isolating member has a stepped cross-section.

5. The tool assembly of claim 1 wherein the interface isolating assembly includes at least two interface isolating members, each interface isolating member positioned about a portion of the motor/drive interface.

6. The tool assembly of claim 5 wherein the interface isolating members are each manufactured from an elastomeric material.

7. The tool assembly of claim 1 wherein the isolating member is manufactured from an elastomeric material.

8. A tool assembly comprising:

a tool housing body;

a motor positioned within the tool body housing;

a drive mechanism connected with the motor via a motor/drive interface to define a unitary motor/drive mechanism assembly; and at least one elastic isolating member extending about a portion of the motor/drive mechanism assembly such that the motor/drive mechanism assembly is elastically isolated relative to the housing body and an interface isolating assembly extending about a portion of the motor/drive interface such that the motor/drive interface is elastically isolated relative to the housing body wherein the interface isolating assembly includes at least two interface isolating members, each interface isolating member positioned about a portion of the motor/drive interface and wherein the motor/drive interface has a pair of projecting wing members and each interface isolating member has a slot configured to receive and surround a respective wing member.

9. A tool assembly comprising:

a tool housing body;

a motor positioned within the tool body housing;

a drive mechanism connected with the motor via a motor/drive interface to define a unitary motor/drive mechanism assembly; and at least one elastic isolating member extending about a portion of the motor/drive mechanism assembly such that the motor/drive mechanism assembly is elastically isolated relative to the housing body and an interface isolating assembly extending about a portion of the motor/drive interface such that the motor/drive interface is elastically isolated relative to the housing body wherein the interface isolating assembly includes at least two interface isolating members, each interface isolating member positioned about a portion of the motor/drive interface and wherein the motor/drive interface has at least one bolt through bore and each of the interface isolating members has a passage configured to align with the through bore, the passages having a diameter smaller than a diameter of the through bore.

* * * * *